Jan. 2, 1962  R. L. SPRINGFIELD  3,015,234
BIMETALLIC MOUNTING
Filed April 14, 1958  2 Sheets-Sheet 2
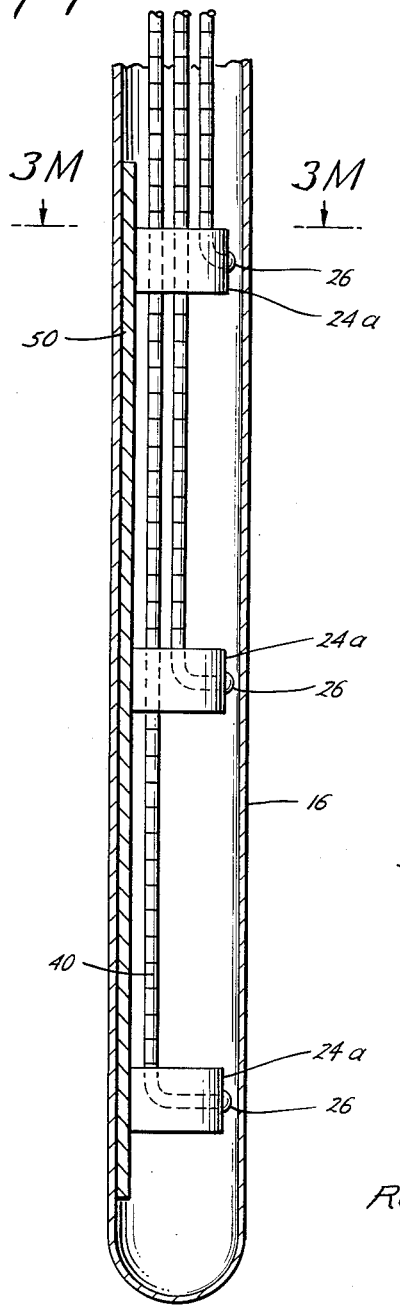
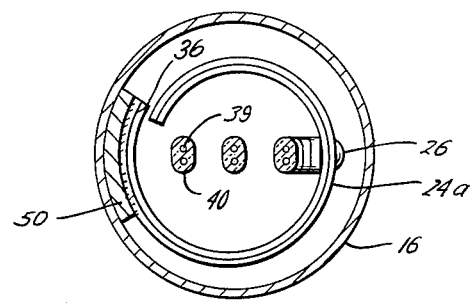
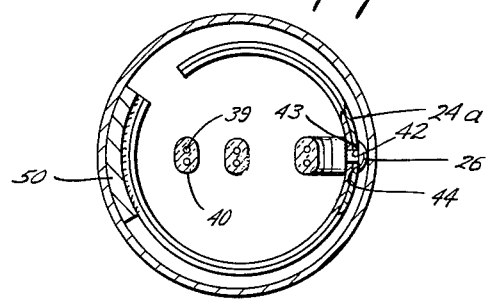
Redwood L. Springfield
INVENTOR.
BY
ATTORNEY

# United States Patent Office 3,015,234
Patented Jan. 2, 1962

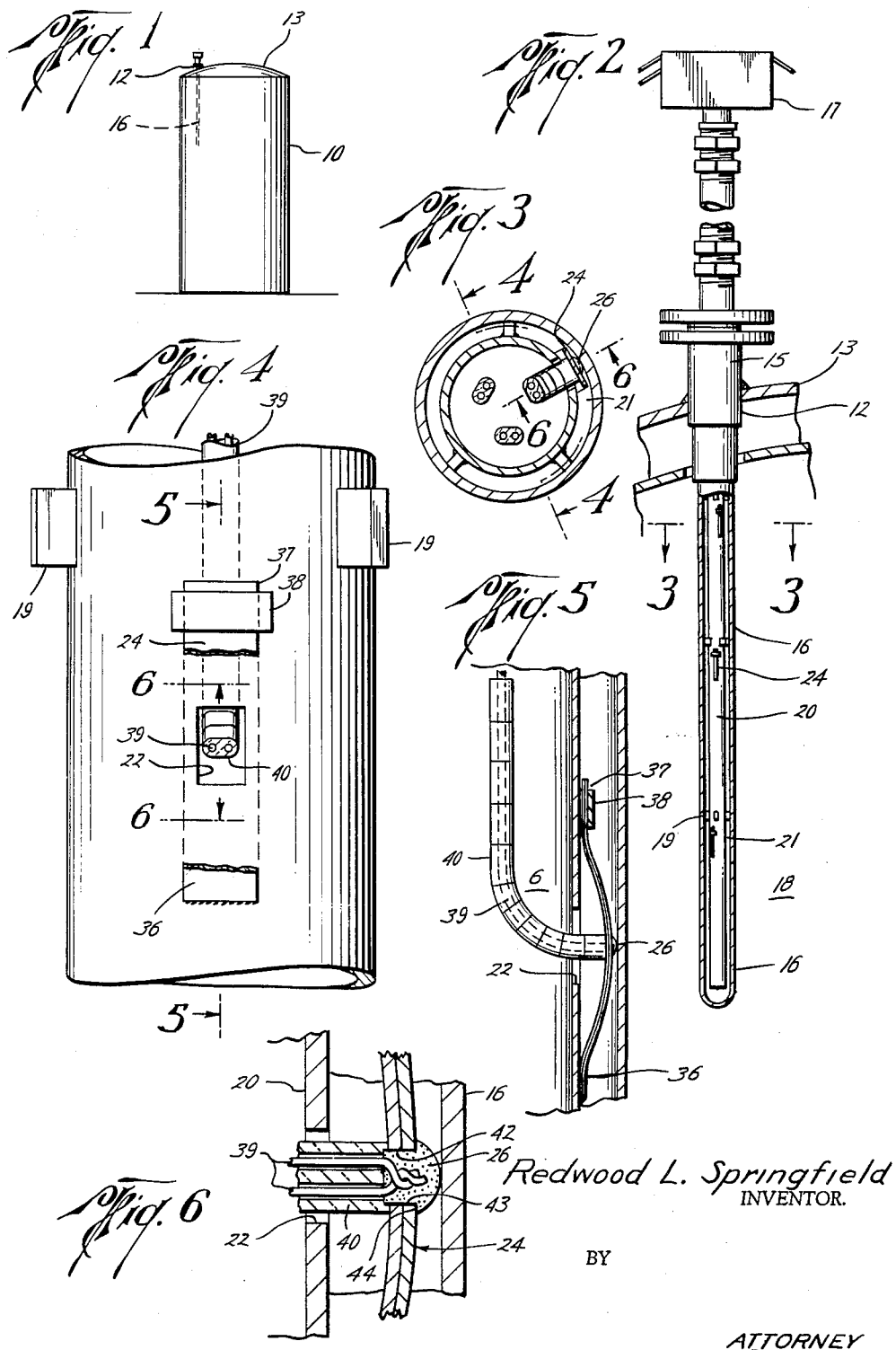

3,015,234
BIMETALLIC MOUNTING
Redwood L. Springfield, % Gay Sales Co., Associates, 420 Sul Ross St., Houston 19, Tex.
Filed Apr. 14, 1958, Ser. No. 728,452
8 Claims. (Cl. 73—339)

This invention pertains to the measurement of internal temperatures of heated chambers such as furnaces of various types or pressure vessels. More particularly, it pertains to the enclosing of high temperature measuring means and the inserting of the enclosures of such high temperature measuring means into the interiors of heated chambers. The measurement of such temperature is accomplished by attaining and sustaining contact between temperature sensitive elements of temperature measuring devices and its enclosure, which enclosure is inserted into the interior and is directly exposed to the heat present in such chambers, furnaces or vessels.

Conventional devices for measuring such internal temperatures usually comprise a temperature sensitive element of a temperature measuring device disposed within a well protruding into the interior of a heated chamber or, for example, a refractory furnace. The well is made of material of high thermal conductivity and the temperature sensitive element is held in contact with the inner surface of the well by the force exerted by a spring.

The greatest disadvantage of the conventional combination is the deterioration of the spring or force exerting component in the presence of prolonged high temperatures found in the wells during operation of a refractory furnace. Such deterioration allows the temperature sensitive elements to sag away from the well wall, losing forcible contact therewith and giving erroneous readings. The loss of contact also results in delay of the reaction of the temperature sensitive element.

At best, the conventional device is subject to the loss of forcible contact with the well wall with the consequences of inaccurate and delayed temperature readings. When the force exerting component fails completely, the thermoelectric couple or temperature sensitive element may lose contact with the well wall entirely, thereby measuring and recording only temperatures of the dead air within the well. The temperature of the dead air in the well is only an inaccurate and poor reflection of the temperature in the interior of the example refractory furnace.

Another disadvantage of the conventional device is that the temperature sensitive element is maintained in a forcibly extended position at all times, even when the furnace is inoperative and there is no need to measure lower temperatures.

Another disadvantage of conventional devices is that in keeping the apparatus in forcible contact at all times, the useful life of the force exerting components is substantially reduced.

Another disadvantage of keeping the apparatus in a forcibly extended condition is the danger of damaging the temperature sensitive components during insertion or withdrawal thereof from the well.

Briefly, the subject device is a means for mounting a temperature sensitive element in a well protruding into the interior of a heated vessel, such as, for example, a refractory furnace, in such a manner that the temperature sensitive element is held in forcible contact with the wall of such well by the flexure of a bimetallic strip. Such flexure takes place only in the presence of temperature of a selected range and the force exerting ability of such component will not normally deteriorate from prolonged exposure to high temperature of the selected range or be caused to fail from fatigue to which the conventional spring type force exerting component is subject.

In the preferred embodiment of the invention, the bimetallic strip is mounted on a perforated hollow sheath which is inserted in the well. The ends of the strips are respectively fixedly and slidably attached to the sheath to allow flexure thereof. Temperature sensitive elements are mounted at the midpoints on the outer sides of the strips and are connected to temperature measuring devices through apertures in the strips and the hollow sheath.

When the sheath is disposed within the well, the presence of temperature of a previously selected range causes the flexure of the strips which forces the temperature sensitive elements against the interior wall of the well. The flexure of the strip holds such elements in sustained forcible contact with the well wall so long as temperatures of a selected range are present.

In the modified embodiment shown, a single spine or rod is used instead of a hollow cylindrical sheath to support the bimetallic strips. Also, the bimetallic strips are arranged in a circular configuration, one end being free and one end attached to the spine. The planes of the upper and lower edges of the strips are normal to the spine component. The temperature sensitive elements of the temperature measuring devices are mounted on the outside of the strips as in the preferred embodiment. The presence of temperature of a selected range causes the strips to flex outwardly, bringing the temperature sensitive contact points forcily into contact with the inner wall of the well.

The most important advantage of an apparatus according to the invention is its durability in the presence of prolonged high temperatures. The force exerting element of the apparatus is activated by temperature of a selected range and relaxes such exertion upon the lowering of the temperature below such range. For these reasons the force exerting element does not deteriorate, even though intermittently exposed to high temperatures for extended periods. Furthermore, the force exerting components of the subject device are relaxed when the furnace is not in use, which characteristic prolongs the life of the device by making it less subject to fatigue.

Another advantage of the subject device is that since it does not continue to forcibly extend the measuring element in the presence of comparatively low temperatures, both the mounting devices and temperature sensitive elements of the measuring device are less subject to damage in insertion and removal from the well.

The main object of the invention is to provide a means for mounting a temperature sensitive element in forcible contact with the wall of a well protuding into the interior of a heated chamber, such as the example refractory furnace, or a pressure vessel, which mounting means will reliably maintain forcible contact between a temperature sensitive means and the well wall, the temperature of which is being measured, in the presence of temperatures of a selected range.

Another object of the invention is to provide such a means for mounting a temperature sensitive element of a temperature measuring device in forcible contact with a well wall, that is protective of the temperature sensitive element and the mounting and the force exerting component thereof during the insertion and removal of such means from such wells.

Other objects and advantages of the invention will appear from the following description of a preferred and a modified embodiment thereof, reference being here made to the accompanying drawings wherein:

FIGURE 1 is a partially schematic and partially elevational view of the preferred embodiment of the subject device disposed in a port in the top side of a refractory furnace.

FIGURE 2 is a partly elevational, partly cut away and partly schematic view of the preferred embodiment of the device.

FIGURE 3 is a sectional view of the device taken at line 3—3 of FIGURE 2.

FIGURE 4 is a partly elevational, partly schematic view of a portion of the preferred embodiment of the device.

FIGURE 5 is a partly elevational, partly vertical sectional view taken at line 5—5 of the portion of the device shown in FIGURE 4.

FIGURE 6 is a vertical sectional view taken on line 6—6 of FIGURES 3 and 4, shown in a larger scale.

FIGURES 2M, 3M and 4M are views of a modified embodiment of the invention.

Referring now to FIGURE 1, a furnace 10 has a port 12 through the wall 13 in which is disposed well 16 shown by dotted lines.

Referring now to FIGURE 2, collar 15 is soldered or welded in port 12 in furnace wall 13. Well 16, which encloses the other elements of the invention is inserted into the furnace interior 18 through collar 15. Enclosure 17 contains cold junctions of thermoelectric couples disposed in wall 16. The cold junctions are connected to lead wires communicating with an external temperature responding means not shown which may be a conventional or any other temperature indicating, recording and/or controlling device. A hollow cylindrical sheath 20 is disposed inside well 16 and spaced apart from the inside wall of the well by guides 19 forming therebetween annular space 21 (see also FIGURE 4). Sheath 20 has slots or ports 22 therein communicating between annular space 21 and the interior of sheath 20. Bimetallic strips 24 are attached to sheath 20 and disposed over slots 22.

Referring now to FIGURE 3, each bimetallic strip 24 carries a temperature sensitive means which is a thermoelectric couple hot junction 26 (see also FIGURES 5 and 6). Bimetallic strips 24 are disposed in annular space 21 between sheath 20 and the inside wall of well 16.

The method of mounting the bimetallic strips 24 on sheath 20 is best shown in FIGURE 4. End 36 of the bimetallic strip 24 is fixedly anchored to the sheath, e.g. by welding, soldering or riveting. The opposite end 37 of the bimetallic strip 24 is slidably attached to sheath 20 by retaining loop guide 38.

Referring now also to FIGURE 5, there is provided means for communicating from the temperature sensitive means to the external temperature responding means. Such communicating means comprises thermoelectric couple wires 39 from hot junction 26 pass through port 22 to the inside of sheath 20 to the aforesaid external enclosure 17 where the wires are joined by cold junctions to lead wires connected to external temperature indicating, recording or controlling devices not shown nor claimed. The bimetallic strip 24 is shown in FIGURE 5 in flexed position, whereby thermoelectric couple hot junction 26 is pressed firmly against the inside of well 16.

Referring now to FIGURE 6, bimetallic strip 24 has an aperture 42 therein through which the lower portion, or barrel 43 of thermoelectric couple hot junction 26 protrudes. The aperture serves to positively locate the thermoelectric couple hot junction 26 relative the bimetallic strip and as a means for communication through the strip for the thermoelectric couple wires 39 which are protected by dielectric thermally insulating material 40. Annular shoulder 44 of the thermoelectric couple hot junction locates it relative the strip so that pressure thereon will not force it back into aperture 42.

In operation, sheath 20 is placed in well 16 and is spaced therefrom by guides 19. Well 16 is constructed of material with a high coefficient of thermal conductivity. The well is inserted into the furnace interior 18 and heat present therein passes through the wall of the well, heats the air within the well and thereby causes bimetallic strip 24 to flex outwardly from sheath 20. The alignment of bimetallic strip 24 in flexure is controlled by loop guide 38. Flexure of the strip forces thermoelectric couple hot junction 26 against the inside of well 16. Since well 16 is directly exposed to the temperature of the interior of the furnace and material thereof is highly conductive, readings received from thermoelectric couple hot junction 26 through thermoelectric couple wires 39 give an accurate reading of internal furnace temperatures. As long as the temperature in the well remains within the selected temperature range, flexure of bimetallic strip 24 will retain thermoelectric couple hot junction 26 forcibly against the inside of well 16. At such time as the furnace is not in use, or the well is opened to lower outside temperatures, the resulting relaxation of strip 24 moves thermoelectric couple hot junction 26 away from the inside wall of well 16. The sheath, strips and thermoelectric couples can thus be removed from or placed in the well without the danger of damage that would otherwise attend such removal if such thermoelectric couples and mountings remained in a constant forcibly extended portion.

In the modified embodiment the reference numerals used are for the same structural components unless otherwise noted.

Referring now to FIGURES 2M, 3M and 4M, a rigid support beam, or spine 50 is disposed in well 16. Bimetallic strips 24A are fixedly attached at end 36 to spine 50, e.g. by welding, soldering, or riveting. Strips 24a are disposed in a plane normal to spine 50. Temperature sensitive thermoelectric couple hot junctions 26 are disposed in apertures 42 in strips 24a and are located therein by barrel 43 and annular shoulder 44. Thermoelectric couple wires 39 are protected by ceramic insulation or other commonly used thermal insulating materials 40. Wires 39 are connected by cold junctions in inclosure 17 to an external temperature indicating, recording and/or controlling device.

In operation, the outward flexure of strips 24a causes forcible contact between temperature sensitive thermocouple hot junctions 26 and the inside of well 16. Other operations are similar to that of the preferred embodiment.

While this invention has been described in its specific application to the measurement of temperature in a heated chamber by insertion of a temperature sensitive means within a well or other enclosing means protruding into the chamber through a hole in the chamber wall and bringing such temperature sensitive means into forcible contact with the well wall, it will be understood that the invention will also find utility in any case where the temperature is to be measured by bringing a temperature sensitive means into forcible contact with a surface. Such surface may be the wall of a well as hereinbefore described or may be the exterior surface of a furnace, boiler, or in fact any surface whose temperature is to be measured.

While a preferred and as well as a modified preferred embodiment has been shown and described herein, many other modifications thereof may be made by a person skilled in the art and it is intended to protect by Letters Patent all forms of the invention falling within the scope of the following claims:

I claim:

1. In the measurement of internal temperatures of a heated chamber having a port in its wall, the combination of a temperature sensitive means; means for enclosing such temperature sensitive means and for inserting said temperature sensitive means into the interior of the heated chamber comprising a hollow, elongated body of heat conductive material closed at one end and adapted to be inserted into the interior of the heated chamber through said port; means for supporting said temperature sensitive means within said enclosing means and for effecting and maintaining forcible contact between the last said means in the presence of temperatures of a selected range comprising an elongated supporting body smaller than and adapted to be disposed within said enclosing body, and at least one bimetallic strip fixedly attached at one end to said supporting body, said temperature sensitive means being disposed on the outer side of said strip facing the wall of said enclosing body, whereby the presence of temperatures of said selected range causes said strips to flex outwardly, bringing said temperature sensitive means into forcible contact with the wall of said enclosing body; and means communicating between said temperature sensitive means and an external temperature responding means.

2. The combination of claim 1, wherein said supporting body adapted to be disposed within said enclosing body comprises an elongated beam element adapted to be disposed in contact with one wall of said enclosing body and wherein said bimetallic strips have a substantially circular configuration and the edges of said strips lie in planes normal to the axis of said beam, and wherein each of said temperature sensitive means is disposed partly in an aperture in each of said strips and partly on the outer side of each of said strips facing the inside wall of said enclosing body, whereby said temperature sensitive means are forced into contact with the inner wall of said enclosing body by the flexure of said strips.

3. The combination of claim 2, wherein said temperature sensitive means comprise the hot junctions of thermoelectric couples and wherein said means communicating between said temperature sensitive means and an external temperature responding means comprise thermoelectric couple wires insulated by dielectric material having low thermal conductivity.

4. The combination of claim 1, wherein said elongated supporting body adapted to be disposed within said enclosing body comprises a hollow tubular body having at least one aperture in the wall thereof and which tubular body has a plurality of outwardly extending guide lugs attached to the outer surface and evenly distributed about the circumference thereof, which lugs are adapted to slidingly engage the inside of said enclosing body, and wherein said bimetallic strips are disposed over each of said apertures and one end of said strips is slidably attached to said tubular body, and wherein each of said temperature sensitive means is disposed partly in an aperture in each of said strips and partly on the outer side of each of said strips facing the inside wall of said enclosing body whereby the presence of temperatures of said selected range causes the flexure of said bimetallic strips forcing said temperature sensitive means into contact with said inner wall of said enclosing body.

5. The combination of claim 4 wherein said temperature sensitive means comprise the hot junctions of thermoelectric couples and wherein said means communicating between said temperature sensitive means and said external temperature responding means comprise thermoelectric couple wires insulated by dielectric material having low thermal conductivity.

6. Apparatus for measuring the temperature of a heated body comprising temperature sensitive means, an enclosure surrounding said temperature sensitive means, a supporting body within said enclosure, and a bimetallic strip attached at one end to said supporting body and having said temperature sensitive means attached to the side of the bimetallic strip facing the heated body, whereby the presence of temperatures above a selected minimum causes the bimetallic strip to flex to bring said temperature sensitive means into contact with said heated body.

7. Apparatus for measuring the temperature of a heated body comprising a supporting body adjacent said heated body, a bimetallic strip attached at one end to said supporting body, temperature sensitive means attached to a side of said bimetallic strip facing the heated body, whereby the presence of temperatures within a selected range causes the bimetallic strip to flex to bring said temperature sensitive means into contact with said heated body.

8. Apparatus for measuring the internal temperature of a heated chamber comprising a port in the wall of said heated chamber, a hollow, elongated body of heat conductive material closed at one end and extending into said chamber through said port, a supporting body within said hollow, elongated body, a bimetallic strip fixedly attached at one end to said supporting body, temperature sensitive means attached to said bimetallic strip on the side of said bimetallic strip facing the wall of said hollow, elongated body, whereby the presence of temperatures above a selected minimum in said hollow, elongated body causes said strip to flex to bring said temperature sensitive means into contact with the wall of said hollow, elongated body, external temperature responsive means, and means communicating between said temperature sensitive means and said temperature responsive means.

References Cited in the file of this patent

UNITED STATES PATENTS

| | | |
|---|---|---|
| 857,452 | Farmer | June 18, 1907 |
| 1,312,175 | Hansen | Aug. 5, 1919 |
| 1,358,723 | Fulton | Nov. 6, 1920 |
| 1,849,906 | Carson | Mar. 15, 1932 |
| 2,381,058 | Jones | Aug. 7, 1945 |
| 2,676,489 | Basham | Apr. 27, 1954 |
| 2,764,024 | Rumble | Sept. 25, 1956 |
| 2,785,278 | Peterson | Mar. 12, 1957 |

FOREIGN PATENTS

| | | |
|---|---|---|
| 685,526 | Germany | Dec. 20, 1939 |